Figure 8:
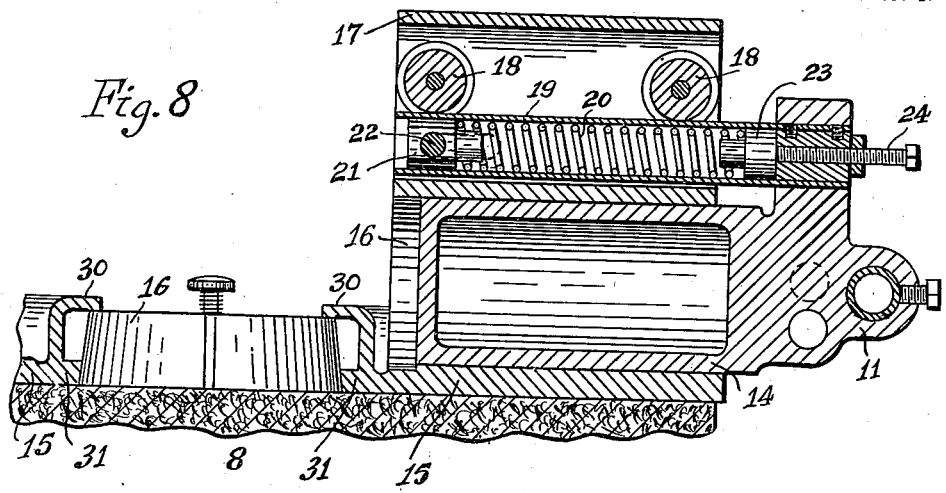

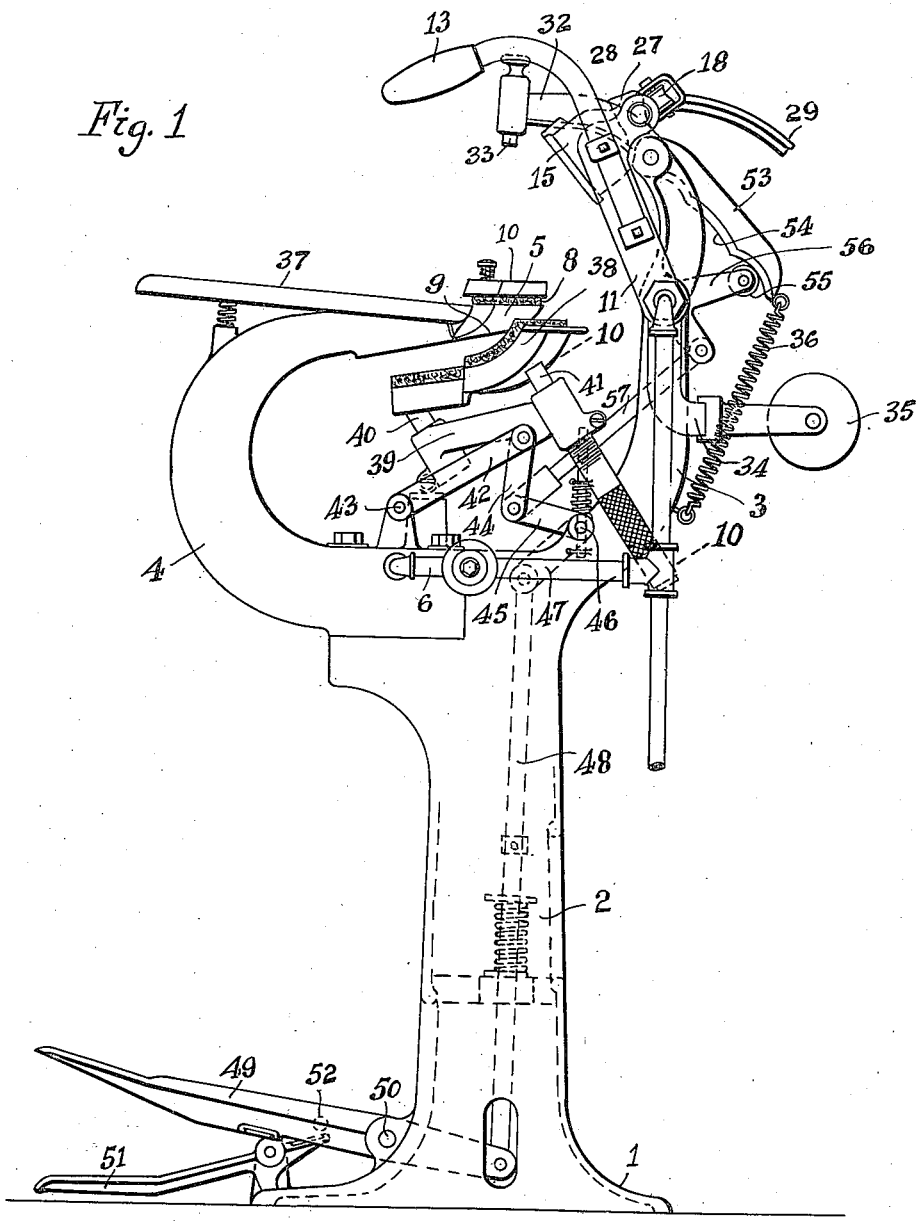

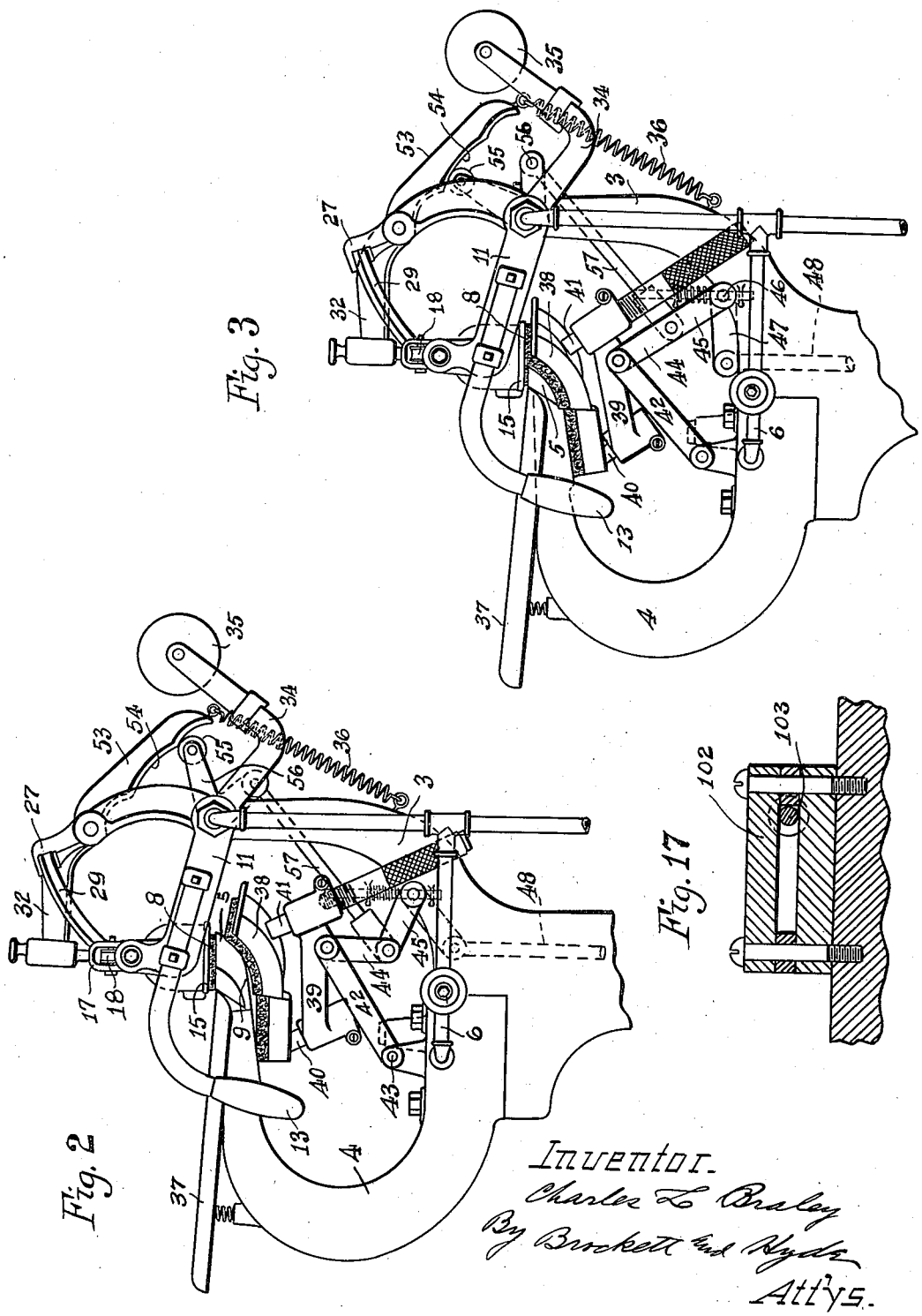

C. L. BRALEY.
METHOD OF PRESSING SHIRTS.
APPLICATION FILED OCT. 9, 1916.

1,429,401.

Patented Sept. 19, 1922.
8 SHEETS—SHEET 3.

Inventor
Charles L Braley
By Brockett and Hyde
Att'ys.

C. L. BRALEY.
METHOD OF PRESSING SHIRTS.
APPLICATION FILED OCT. 9, 1916.
1,429,401.
Patented Sept. 19, 1922.
8 SHEETS—SHEET 4.
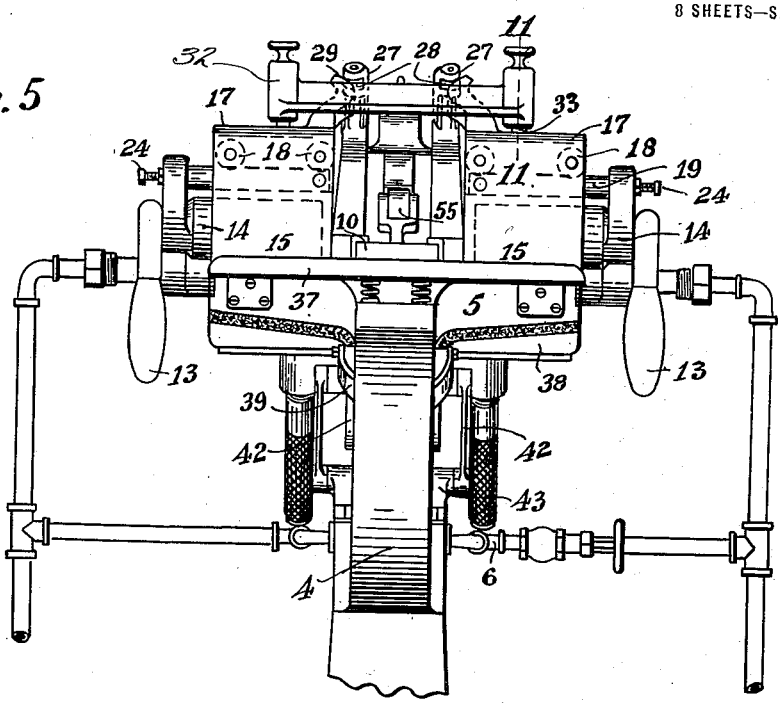
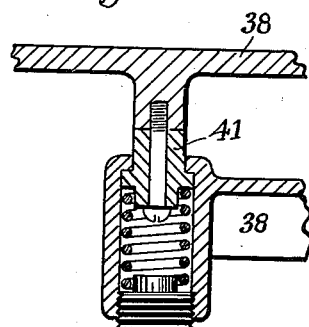
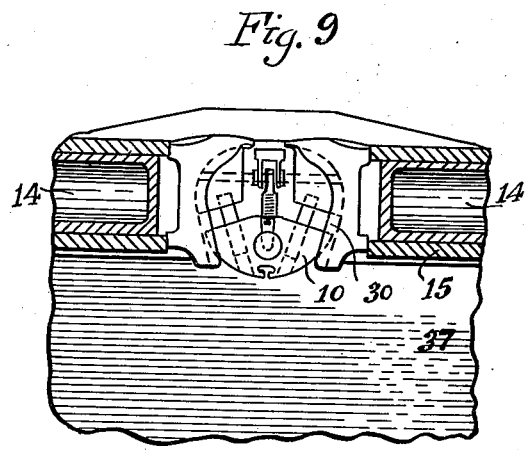
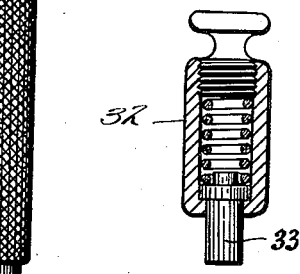
Inventor.
Charles L. Braley
By Brockett and Hyde
Atty's

C. L. BRALEY.
METHOD OF PRESSING SHIRTS.
APPLICATION FILED OCT. 9, 1916.

1,429,401.

Patented Sept. 19, 1922.
8 SHEETS—SHEET 5.

Inventor.
Charles L. Braley
By Brockett and Hyde
Attys.

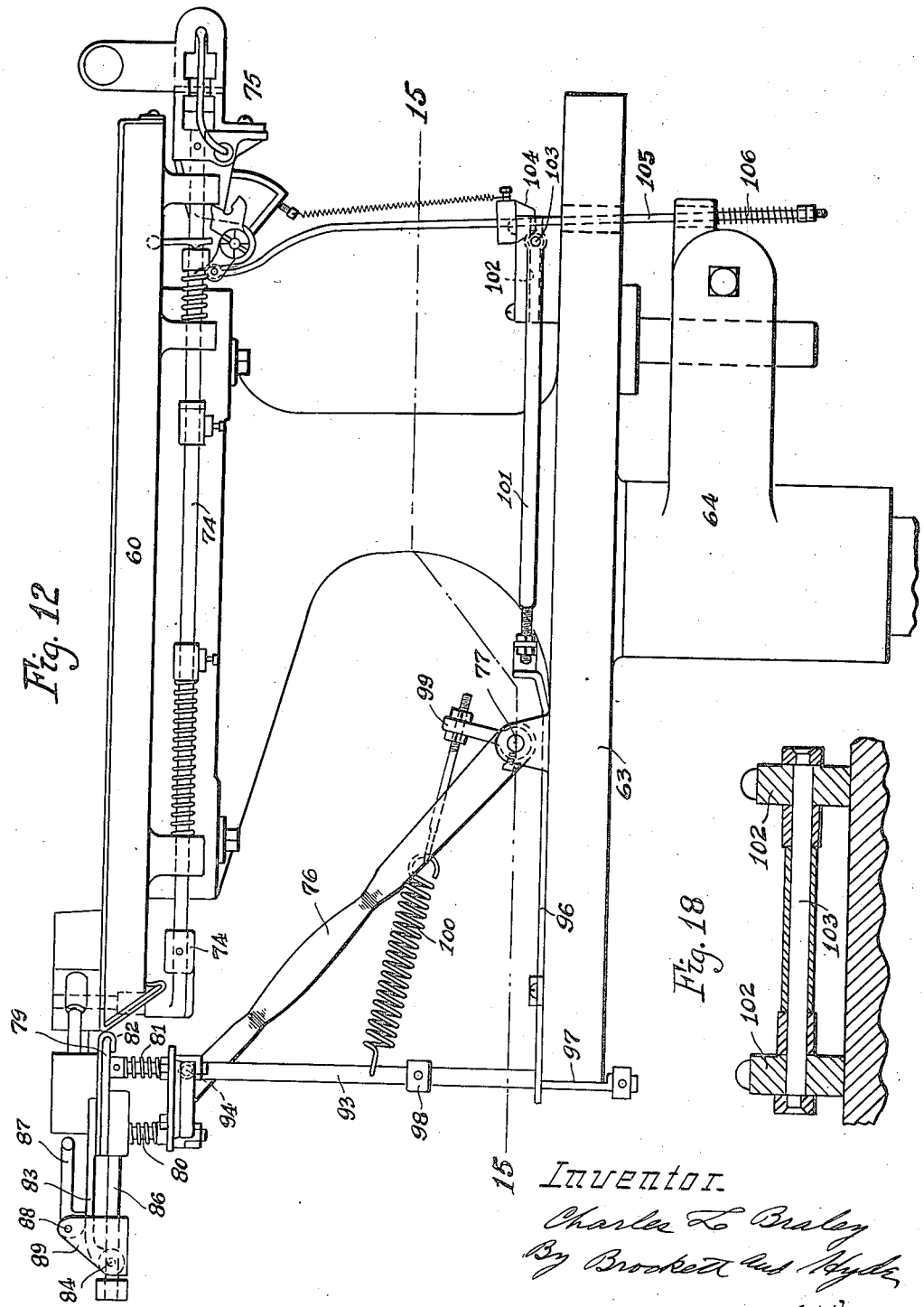

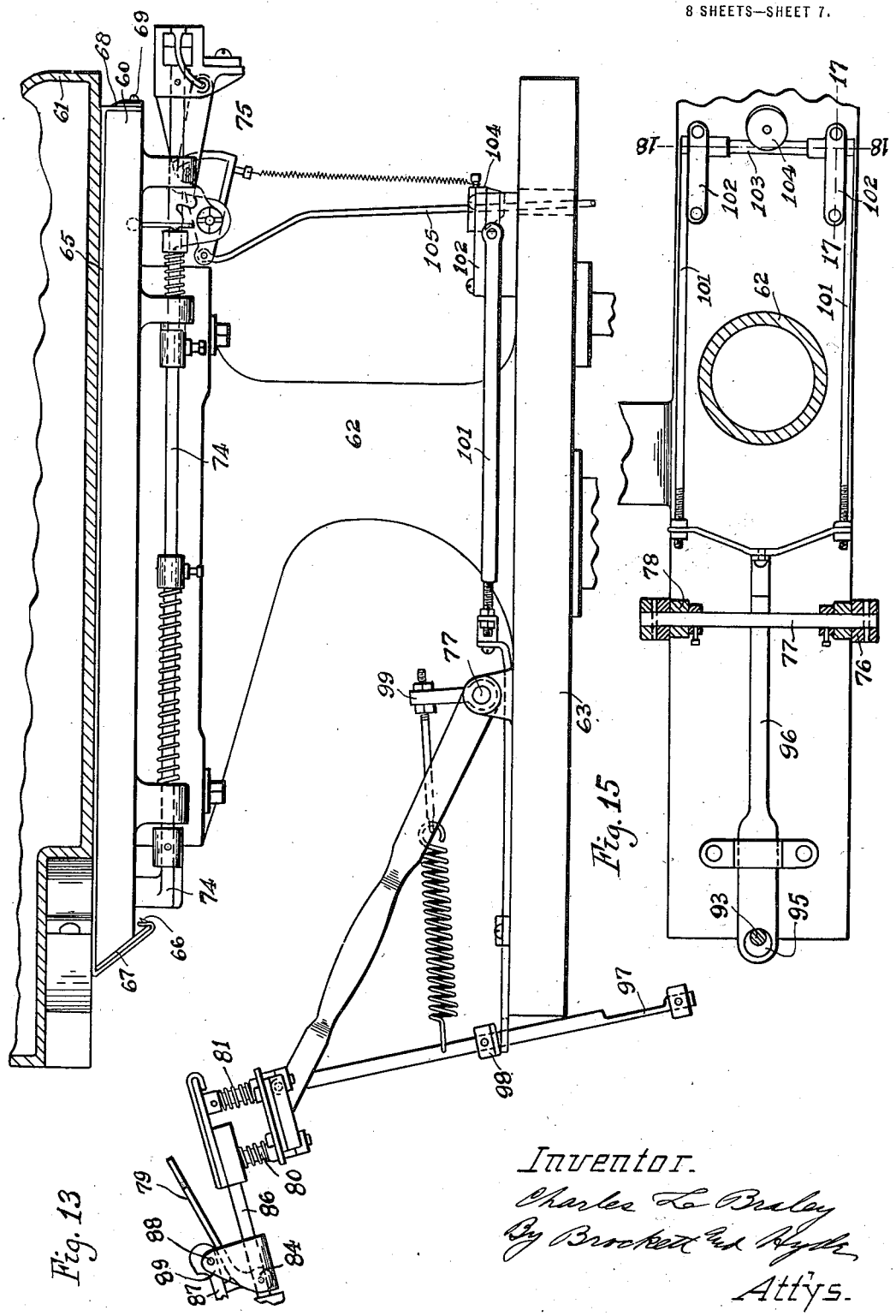

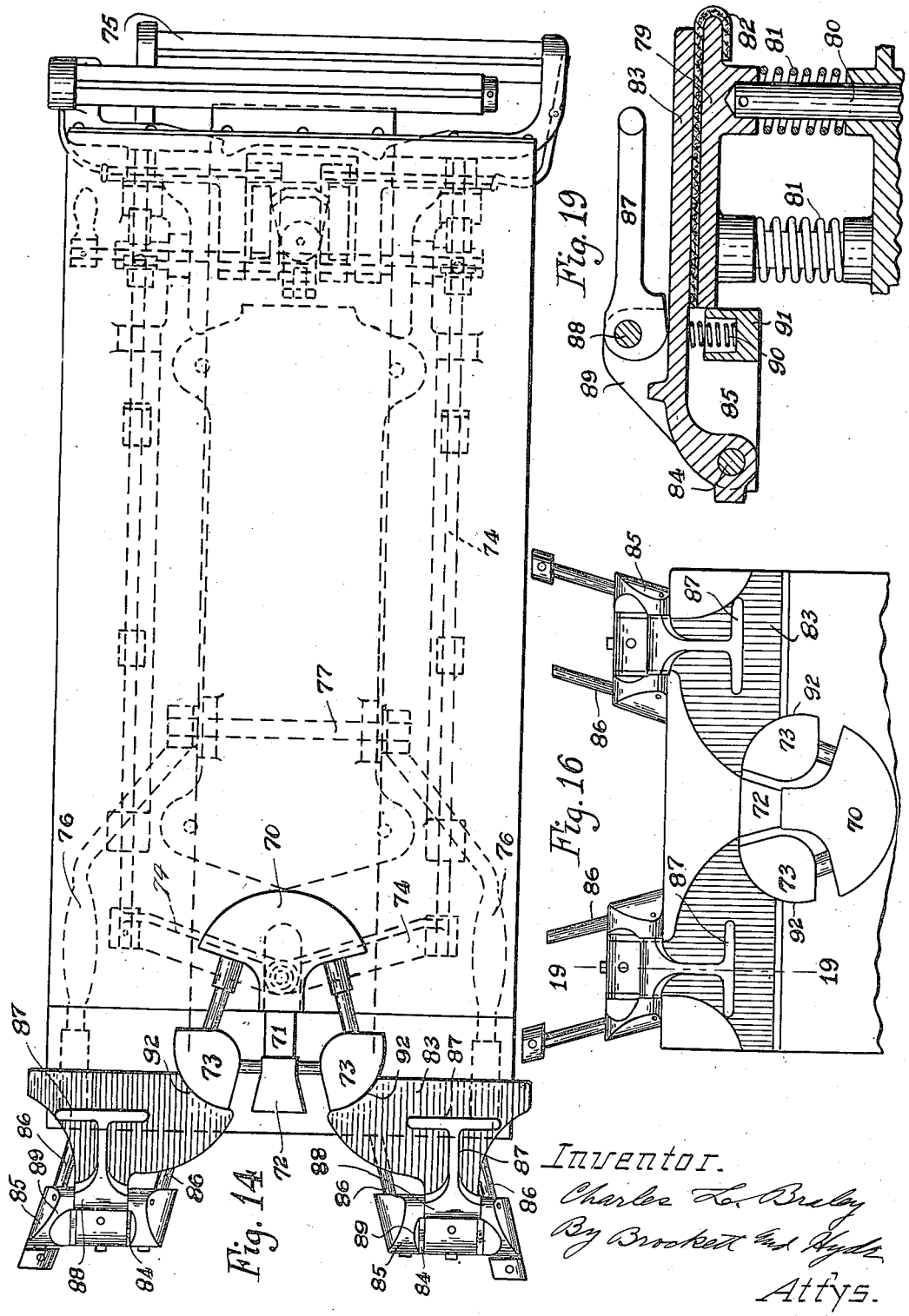

Patented Sept. 19, 1922.

1,429,401

UNITED STATES PATENT OFFICE.

CHARLES L. BRALEY, OF CINCINNATI, OHIO, ASSIGNOR TO THE AMERICAN LAUN: \Y MACHINERY COMPANY, OF CINCINNATI, OHIO, A CORPORATION OF OHIO.

METHOD OF PRESSING SHIRTS.

Application filed October 9, 1916. Serial No. 124,585.

*To all whom it may concern:*

Be it known that I, CHARLES L. BRALEY, a citizen of the United States, residing at Cincinnati, in the county of Hamilton and State of Ohio, have invented certain new and useful Improvements in Methods of Pressing Shirts, of which the following is a specification.

This invention relates to a method of pressing shirts, and more particularly what are known as "stock shirts". "Stock shirts" are shirts as first put out by the manufacturer to be kept in stock by the retailer. The first laundering of such shirts is important since the appearance of the shirt, or in other words its attractive "dress" or "set-up", has considerable to do with the price it can command. Shirt manufacturers therefore must press such shirts to certain well established forms or lines.

The sleeves and body of the shirt are, of course, folded in under the shirt front or bosom, as is usual. It is essential that the neck band end of the shirt shall be of superior appearance and form. The neck band must be stiff and stand up in approximately cylindrical form. The seams between the yoke and bosom at the sides of the neck band must be exactly transverse or perpendicular to the length of the shirt and in line with each other, and the folds in the yoke at the end of the shirt must be along a line or lines tangent to or touching the neck band and sloping away therefrom at equal angles and symmetrically disposed on opposite sides of the neck band.

Prior apparatus and methods for pressing stock shirts have been only partially successful due to the inability to so manipulate the shirt as to secure and maintain the desired "dress" or "set-up", for which reason the more expensive and desirable shirts have always been pressed by hand. Moreover such prior methods and apparatus have required highly skilled operators with sufficient experience to enable them to make the best guess as to how to dress up the shirt for pressing to get the best final results. According to prior methods the first part of the shirt to be pressed has been the back portion of the yoke, which is pressed and held on a form while the front part of the yoke at the sides of the neck band, and also the bosom, are stretched or pulled to shape for pressing. The final location of the exposed seams and folds has therefore depended upon the yield or stretch of the particular material, the design of the shirt, the presence or absence of pleats, pockets or longitudinal rows of stitching or other features which might cause puckers or wrinkles in different places, and the different lines or directions of the fabric threads in the yoke and bosom, causing unequal stretching of the fabric on longitudinal pulls. All these factors have made it necessary for the operator to judge carefully how to arrange the back of the yoke for the first pressing to compensate for variations in stretch and ultimately approximate the desired "dress" or "set-up", in spite of which care perfect and uniform pressing has never before been more than approximated.

The object of the present invention is to provide an improved method and an apparatus which dispense with highly developed skill or judgment by the operator and secure uniformly good results on all grades and kinds of shirts, whether cheap or expensive, and irrespective of the kind of fabric or design of the shirt, and which carry out the pressing operation along logical lines in a manner to first fix or establish the important lines in the "dress" of the shirt and retain such lines while pressing the remaining portions, the ultimate object being to secure a superior finish and "dress" and thereby command a higher price and insure a greater demand for the product.

Further objects of the invention are in part obvious and in part will appear more in detail hereinafter.

Figure 4:
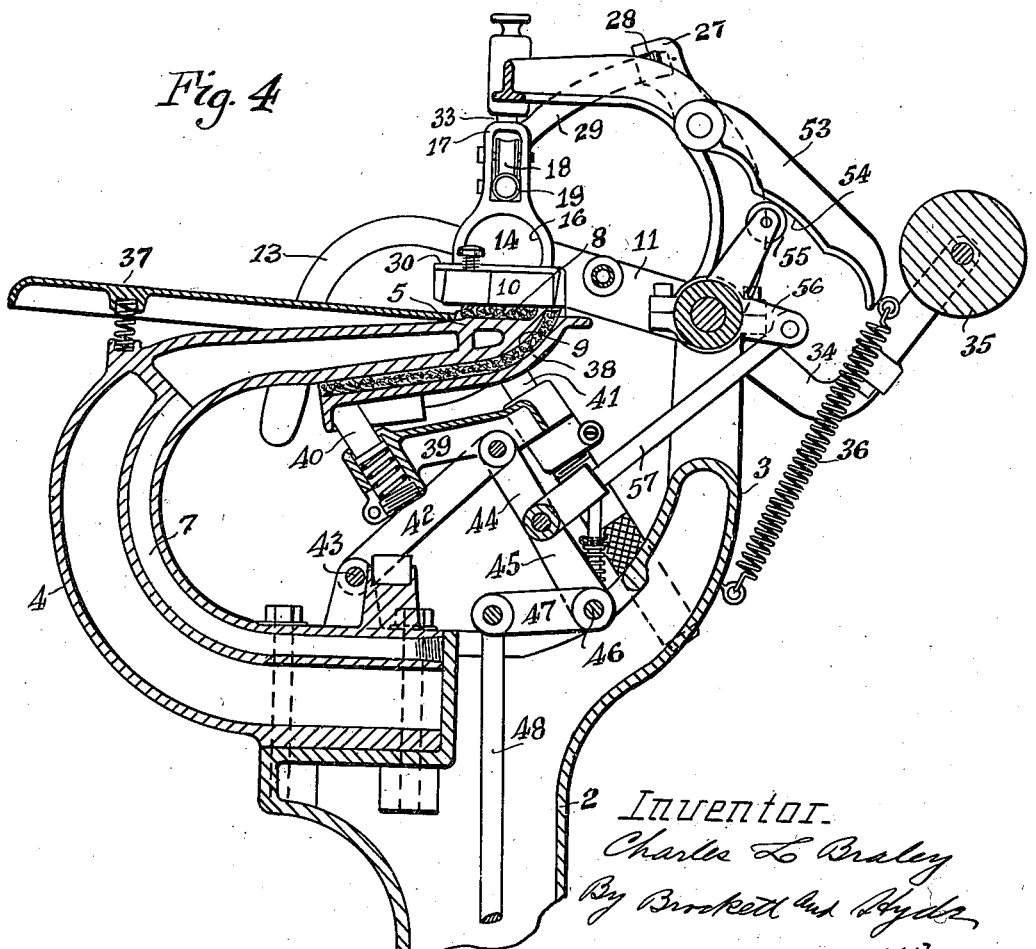
Figure 6:
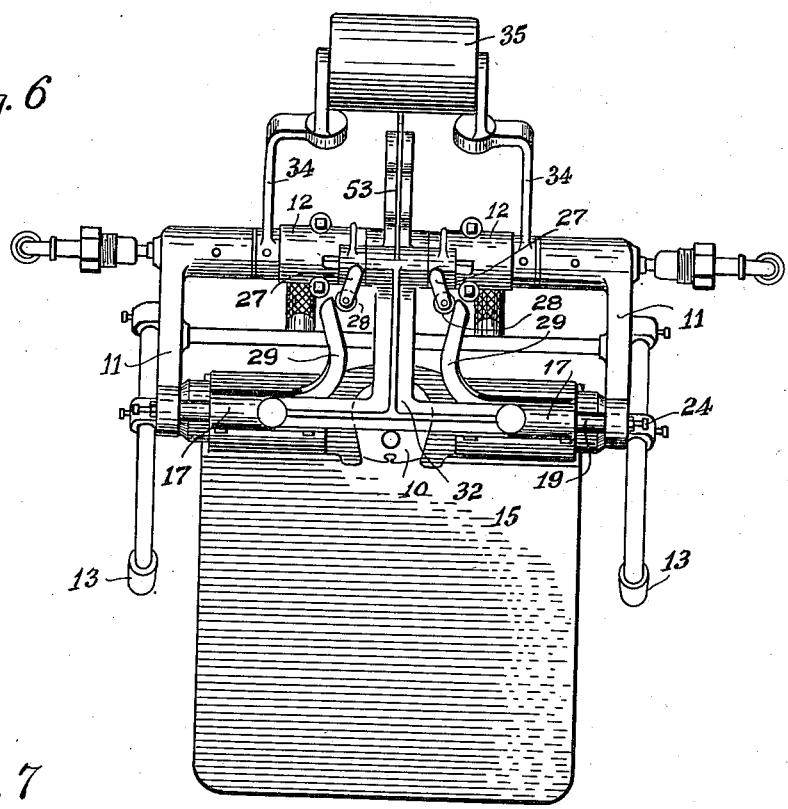
Figure 7:
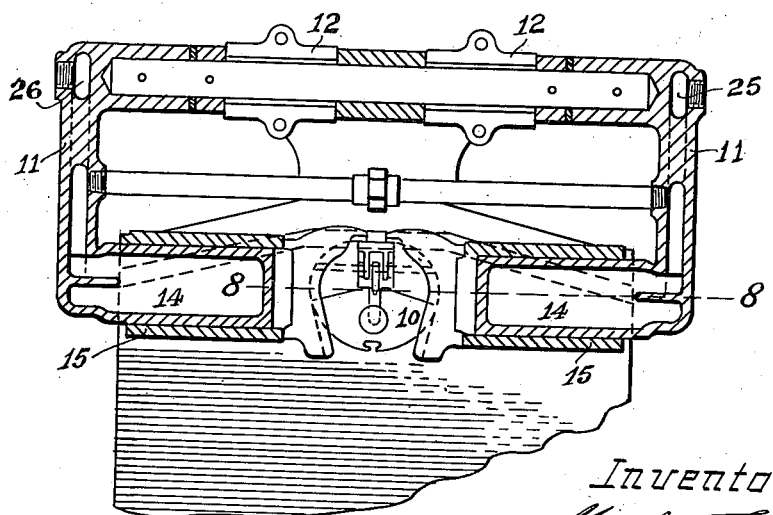

In the drawings, which represent one embodiment of apparatus suitable for carrying out the method, Fig. 1 is a side elevation of the yoke ironing machine, showing the parts in normal position out of pressing relation; Fig. 2 is a similar view of the upper portion of the machine with the carrier lowered to bring the pressing members into engagement with the bed; Fig. 3 is a similar view, showing the parts after pressure has been applied to the carrier and clamping member; Fig. 4 is an enlarged central sectional view of the parts in pressing position; Fig. 5 is a front elevation of the upper portion of the machine; Fig. 6 is a plan view; Fig. 7 is a horizontal section through the heating chambers on the carrier; Fig. 8 is a cross section on the line 8—8, Fig. 7; Fig. 9 is an enlarged detail sectional view in a horizontal plane of the parts shown in Fig. 7; Fig. 10 is a cross section on the line 10—10, Fig. 1; Fig. 11 is a sectional view on the line 11—11, Fig. 5; Fig. 12 is a side elevation of the bosom press, showing the yoke supporting and clamping means elevated into operative relation with the bosom board; Fig. 13 is a similar view, showing the heated chest in section, and the yoke supporting and clamping means released; Fig. 14 is a plan view with the parts in pressing position; Fig. 15 is a horizontal section on the line 15—15, Fig. 12; Fig. 16 is a plan view, on a larger scale, of the neck band end of the board; Fig. 17 is a sectional view on the line 17—17, Fig. 15; Fig. 18 is a sectional view on the line 18—18, Fig. 15; and Fig. 19 is a sectional view on the line 19—19, Fig. 16.

The method may be carried out by hand or on any suitable form of apparatus, one form of which has been shown in the drawings merely for the purposes of illustration. The method consists, broadly, in first pressing the important lines or portions of the shirt, which are exposed adjacent the neck band, in their final form or position, thereby fixing or establishing a definite "dress" or "set-up" for this portion of the shirt, which forms a base from which to work over the rest of the shirt, pressing the same without disturbing the previously established "set-up."

The shirt is dressed or arranged upon a suitable form, which may be an ordinary ironing board or the press board or bed of a machine. The neck band, of course, has been previously pressed to stiff approximately cylindrical form, and is held in such form by a former, such as a shaped block. The seams between the yoke and bosom at the sides of the neck band are laid in line with each other and exactly transverse to the length of the shirt, while the neck band is laid at the end of the board, the general line of which is therefore tangent to or touches said neck band and slopes away on either side along symmetrically disposed lines of equal inclination. The back of the yoke is disposed underneath the board.

The back of the yoke may also be arranged underneath the board and both the front and back portions of the yoke pressed simultaneously, but in any event the front must be first arranged and held before arranging or pressing the back. Preferably, however, the front of the yoke is pressed first and held firmly while arranging and pressing the back of the yoke.

When the front of the yoke is properly arranged it is pressed into final form with a suitable pressing or ironing device, such as a movable platen or even an ordinary flat iron, and is held against the board in such pressed position to enable the operator to stretch or arrange the back of the yoke underneath the board in flat form, without wrinkles, for pressing.

The back of the yoke is then pressed, either by turning over the board or by bringing an iron or platen up against said yoke from beneath. The yoke is ironed or pressed, both above and below the board, clear out to the neck band end of the board, which forms a crease or fold in the yoke tangent to or touching the back of the neck band.

The steps so far described fix or establish a definite "dress" or "set-up" for those portions of the shirt adjacent the neck band, and which will be exposed to view in the finished shirt. The remaining portions of the shirt can be pressed with the shirt lying on the same board in its previously formed and pressed condition, or, said shirt can be taken off and applied to a new board for further pressing by hand, or which new board may be part of a second machine.

In the second operation the shirt is dressed on the board, as before, and pressure is applied to those portions of the yoke lying at the sides of the neck band, and which have been already pressed and set, to clamp them securely to the board in their established arrangement, with the yoke seams transverse. The operator then stretches the bosom to flat unwrinkled form by pulling down on the shirt tails, but such pull does not disturb or disarrange the previously pressed yoke. The bosom is stretched by longitudinal pulls at various points along its width, the force of the pull depending on the design and form of the shirt, whether pleated or not, etc., but in any event the operator can so manipulate the bosom as to lay it absolutely flat and without wrinkles by any necessary pull, without fear of disarranging the clamped yoke. No special skill is necessary except to see that wrinkles are removed.

The bosom is then pressed in any suitable manner, as by a platen or even with an ordinary flat iron. This finishes the ironing of the shirt, which can be folded and fastened in the usual manner for sale.

Various forms of apparatus are suitable for carrying out the method. The apparatus may be a single machine provided with a pressing board or form on which the shirt is dressed, together with the necessary heated pressing members or platens for pressing and clamping the different parts of the shirt. The apparatus shown in the drawings, however, consists of two distinct machines performing respectively the two operations, or more accurately sets of operations, of pressing, each machine therefore contributing its respective share to the ultimate unitary result. These machines are of the form shown and described in my prior applications for yoke ironing machine, filed Aug. 10, 1915, Ser. No. 44698 and bosom presses, filed Sept. 4, 1915, Ser. No. 49020 to which reference may be had for a more complete description of the invention.

The yoke ironing machine comprises a base 1 and an upright portion or standard 2 having a rear vertical extension 3. Mounted on the upper forward portion of the standard 2 is a hollow support 4 upon which is formed the bed 5 also preferably hollow, and which may be supplied with a heating medium through supply and discharge pipes 6, and passages 7. The upper surface of the bed 5 has a padded covering 8 while its under side affords a smooth ironing surface 9 that receives the inside of the shirt or garment, which is held against the ironing surface 9 by means of a clamping member that will be described presently. The upper and lower surfaces of the bed meet along the line of its transverse end edge, which serves, with the co-operating pressing members, to produce a fold in the pressed garments. The bed 5 is also provided on its upper surface with a neck band expander designated generally at 10 and embracing means for stretching the neck band of any size shirt after the well known manner in this class of machinery. Arranged for engagement with the upper or padded surface of the bed is a pair of separate pressing members co-operating with the bed on opposite sides of the neck band expander, and I will now describe the means for supporting and operating said pressing members.

11 is a carrier or frame that is swingingly mounted with relation to the bed in the bearings 12, and is provided with suitable means, such as the handles 13, for lowering the carrier to bring the pressing members down into the bed. The carrier 11 includes a pair of heating members or chambers 14, preferably cylindrical, upon which the pressing members are slidably arranged. To this end each pressing member, designated at 15, as shown in Fig. 8, includes a cylindrical opening 16 for engagement with the heating chamber. The pressing member 15 also includes an upper portion 17 carrying antifriction rollers 18 which engage a guide 19 mounted on the carrier. 20 is a spring arranged within the hollow guide 19, and affording means for actuating the pressing member inwardly, or toward the neck band expander during the downward movement of the carrier as appears in Fig. 8. To this end the spring 20 co-operates with a movable abutment 21 which is connected to the pressing member by a pin 22, and the tension of the spring 20 can be adjusted by means of the movable abutment 23 controlled by the threaded stem 24. The construction and arrangement of both of the pressing members is the same, and for convenience I have described only one of them. The heating members 14 may be supplied with a suitable heating fluid through the inlet and outlet openings 25 and 26 respectively which connect with the heating members through the ports indicated in Fig. 7, or in any other convenient manner as may be desired. During the upward movement of the carrier the pressing members are moved away from the neck band expander in opposite directions by means of projections 27 on the main frame, carrying antifriction devices 28 which engage cams or curved arms 29 carried by the pressing members and operating to move the latter from the position shown in Figs. 6 and 7 in opposite directions away from each other. The pressing members also include means for engaging the upper surface of the neck band expander, preferably in the form of a flange 30, which thereby serves to force the latter downwardly into tight engagement with the bed, while the inner edge 31 is brought into engagement with side of the expander so as to iron the surface of the garment close up to the neck band. After the pressing members have been brought into engagement with the bed by lowering the frame, it is necessary to apply additional pressure to complete the ironing operation, and with this in view I arrange on the main frame a pressure device which may comprise a pivoted lever 32 provided with yieldable plungers 33, one arranged for co-operation with each of the pressing members after the latter are in pressing position, and acting to force the latter tightly into engagement with the bed when the lever 32 is actuated in the manner that will be described presently. The carrier is provided with an extension 34 weighted at 35 for returning the carrier to its normal position shown in Fig. 1, and 36 is a spring connected to the lever 32 for maintaining it in normal position.

The bed 5 has a yieldable table or surface 37 in advance thereof, for supporting the body of a garment. The garment is forced into engagement with the ironing surface 9 by means of a padded clamping member 38 which is mounted on a frame 39 by means of yieldable plungers 40 and 41 that permit the clamping member to be moved into proper engagement with the bed by a resilient, yielding action. The frame 39 is pivotally connected to a link 42 mounted at 43 at one end and connected to a toggle joint comprising links 44 and 45.

The link 45 is fixed on a rock shaft 46 carrying a link 47 to which is connected a rod 48 and 49 is a treadle lever pivoted at 50 and operatively connected to the rod 48.

When the lever 49 is operated, the toggle joint is straightened and locked causing the clamping member to be brought into engagement with the ironing surface of the bed, and to release the clamping member treadle 51 is operated, engaging projection 52 on the lever 49, and elevating the latter causing the toggle joint to be broken and thus releasing the clamping member. I also provide for applying pressure to the pressing members on the carrier simultaneously with the engagement of the clamping member onto the bed and with this in view, the lever 32 carries an extension 53 having cam surfaces 54 thereon arranged to be engaged by a roller 55 on a bell crank lever 56. Pivotally associated with the latter is a connecting rod 57 in turn pivoted at the center of the aforementioned toggle joint so that when the latter is operated to effect movement of the clamping member, the bell crank lever 56 is also actuated, elevating the rear end of lever 32 and lowering its front end in the manner shown in Fig. 4 whereby sufficient pressure is applied to the pressing members.

The operation of the yoke ironing machine, briefly is as follows: The parts are normally in the position shown in Fig. 1 and in applying a garment such as a shirt for instance, it is positioned over the bed with the inside of the yoke underneath engaging the ironing surface 9 and the neck band secured about the neck band expander. The portions of the yoke at the sides of the neck band are then arranged upon the bed in such position that the seams in the garment between the yoke and bosom portions are transverse to the length of the bed. Thereupon the carrier is swung downwardly by hand to bring the pressing members into the proper relation with the bed and neck band expander as indicated in Figs. 2, 6 and 7. In this position the pressing members hold the bosom and yoke portions at the sides of the neck band in the proper position, clamping it to the bed so that the operator can stretch the yoke underneath the bed into proper pressing position beneath the same. The parts are now in position to effect pressing and this is done by depressing the treadle lever 49, bringing the clamping member 38 upwardly and forwardly into engagement with the under surface of the bed and at the same time applying the required pressure to the pressing members on the upper surface of the bed. The bosom and yoke pressing members, when applied under pressure to the upper and lower surfaces of the bed, produce a fold in the garment along the transverse end edge of the bed. This fold and the pressed yoke portions may be utilized as a base with relation to which the remaining portions of the shirt are folded and pressed, so that the finished product is symmetrical, with said fold line substantially tangent with the neck band and the shoulder seams square with the length of the shirt. The parts are released by operating the treadle 51 as aforesaid and the carrier is then swung upwardly and backwardly by the operator engaging the handles 13.

The operation of the yoke ironing machine in the manner so far described fixes or establishes the "dress" or "set-up" of that portion of the shirt adjacent the neck band, with all of said parts properly arranged in their desired positions and perfectly pressed without wrinkles, puckers or the like. The shirt is then removed from the yoke ironing machine and applied to the bosom press now to be described, said shirt being dressed on the board of the bosom press in the same manner as on the yoke ironing machine with such exceptions as may be hereafter noted, preparatory to pressing the bosom.

The bosom press, shown in Figs. 12 to 19 comprises a bosom board 60 for receiving the bosom of a shirt and a heated bed or chest 61, one of which parts is movable with relation to the other into and out of pressing relation, and for the purposes of this application it is sufficient to state that the machine may operate similarly to the usual type of machine of this class, in which the heated chest is stationary and the board is movable vertically into and out of engagement with the chest. To this end, the board is arranged on a standard 62 mounted on the support 63, which may be operated up and down within a stationary guide or bracket 64 by any convenient actuating means. The board 60 is provided with a cloth covering 65, retained thereon by suitable means, as by pins 66 on the stationary plate 67, which secure the cloth at one end, and a plate 68 held by screws 69 for securing it at the opposite end. A neck band expander is provided on the bosom board, comprising a forward stationary portion 70, and an adjustable member 71 carrying the rear portion 72, and corner or tail portions 73, which are curved as shown, to engage the inner surface of a neck band, and are guided in their movements by suitable devices as well known in this type of construction, and as illustrated in my pending application, filed March 4, 1915, Serial No. 11,940. The member 71 of the neck band expander is connected to and adjusted by a frame 74 extending longitudinally beneath the bosom board and carrying at its opposite end suitable tail stretching devices, designated generally at 75 and the details of which form no part of the present invention and require no description.

It will be seen that in the normal and operating positions of the neck band expander, the tail portions thereof extend beyond the edge of the bosom board, and beneath these adjustable portions of the expander are disposed the yoke and shoulder portions of the shirt, which are shaped and ironed previously on a machine designed for this particular purpose, and I will now describe the parts of the present apparatus which are provided for supporting and retaining the yoke portion of the garment during the operation of ironing the bosom, in such a manner as to prevent destroying the shape or ironing effect that has already been imparted to the yoke and shoulder portions. Pivotally mounted on the support 60 is a carrier including arms designated at 76 and fixed on a spindle 77 which is suitably journalled in bearings 78. The carrier just referred to is provided with yoke supporting and clamping means, and to this end it includes a yoke supporting member 79 which is yieldably mounted on the carrier by means of pins 80 carried by the member 79 and engaging openings in the carrier. Surrounding the pins 80 are springs 81 which act to maintain the yoke supporting member in its normal position, while at the same time permitting slight yielding movement downwardly or upwardly in order to insure its horizontal alinement with the bosom board. The yoke supporting member is preferably provided with a padded surface 82 and also with clamping means for co-operation with the yoke to maintain the latter on the supporting member. The clamping means referred to is preferably arranged on the carrier, and to this end it includes independent clamping devices 83, each of which is pivoted about a bearing 84 upon a base portion 85. The latter is slidable forwardly and rearwardly upon guides 86 in order to permit adjustment of the clamping devices into proper relation with the neck band expander. 87 designates a cam locking lever pivoted on the bearing 88 which is secured between lugs 89, the cam lever 87 acting, when moved downwardly to the position shown in Fig. 19 to lock the clamping device 83 against the shirt on the padded surface of the yoke supporting member and thereby retain the yoke tightly thereon. The spring 90 is arranged in a recess 91 and engages the underside of the clamping device 83 to impart a resilient action thereto. It will be seen that the construction and arrangement of both clamping members is identical in every respect and for convenience in the present description, I have described only one of these. The yoke supporting member 79 is preferably coextensive with the width of the ironing board, that is, extending from one side thereof to the other, and each of the clamping devices 83 preferably extends from one end of the yoke supporting member inwardly, terminating in a curved edge 92, which is adapted to be positioned adjacent to the neck band, and in close proximity to the outer surface of the adjacent tail portion of the expander. By reason of the adjustability of each base 85 upon guides 86, the operator is permitted to adjust the neck band expander in the first instance in accordance with the size of the neck band, and thereafter to move the clamping devices 83 with the base portions 85 toward the expander until the curved surfaces 92 abut against the edge of the neck band on the expander, after which the clamping levers 87 are operated to lock the clamping devices against the garment.

When the parts are in operative relation for ironing a bosom the yoke supporting and clamping means is in the position shown in Fig. 12 maintaining the yoke in horizontal alinement with the bosom, and provision is made for allowing the yoke to drop downwardly away from the bosom board as soon as the latter is in ironing relation with the heated bed. The yoke supporting member is held in its uppermost position by means of a vertical rod or bar 93 which is pivotally connected thereto at 94 and is movable within an opening 95 of an actuating rod 96 to be presently described. Rod 93 is cut away or recessed at 97 for engagement with the end of the support 63, as shown in Fig. 12 and 98 is a collar fixed on the rod 93 and serving to limit its downward movement, as appears in Fig. 13. 99 is an arm fixed on the spindle 77, and 100 is a spring serving to connect the rod 93 and arm 99, and acting to hold the rod 93 in the position shown in Fig. 12 in order to maintain the yoke supporting member in its uppermost position. In order to release the yoke supporting member, automatic devices are provided which are brought into operation at the moment when the heated bed and ironing board are brought into ironing relation, and this is accomplished in the following manner. The actuating bar 96 is connected to a frame 101 slidable laterally in guideways 102 as shown in Fig. 17, and including a cross bar 103 arranged in the path of an inclined collar 104 secured to the rod 105. The latter is connected at its upper end to a part on the ironing board and at its lower end to the stationary frame of the machine through an intermediate spring 106. By this means, as the support 63 moves vertically, the cross bar 103 engages the inclined collar 104 and causes the frame 101 to move laterally. At the limit of the upward movement of the support and ironing board, the frame 101 will have moved far enough to force the rod 93 laterally until recess 97 is disengaged from the support, whereupon the yoke supporting member falls away from the ironing board. The vertical rod 105, already referred to, is also connected to releasing devices for the neck band expander and tail clamping means, but as this forms no part of the present invention it is unnecessary to describe these parts.

In applying and ironing a shirt with the present construction, the operator proceeds as follows: The yoke supporting member is moved upwardly by hand until it assumes the position shown in Fig. 12, the clamping devices, however, being disengaged, as appearing in Fig. 13. The shirt is then placed on the board, the back of the shirt of course lying under said board, in the usual way, and the neck band expander is operated until the neck band is fully stretched. The clamping devices are then moved into close engagement with the neck band, arranged about the expander, substantially as indicated in Fig. 14, the clamping levers are then operated to maintain the clamping members tightly in engagement with the yoke on the supporting member, and the tail portions of the shirt are tightened by the tail stretching members to lay the bosom nicely and without wrinkles upon the board. The parts are now ready for ironing and the bosom board is brought into pressing relation with the heated chest by moving upwardly. At the limit of its upward movement, the rod 93 is kicked off from the support 63 and the carrier together with the yoke supporting and clamping members, is permitted to fall away from the bosom board. This causes an additional stretching and tightening of the body of the shirt, since the latter is retained on the yoke supporting member by the clamping devices, and thereby limits the movement of the yoke supporting member, the weight of the latter, together with its associated parts, being sufficient to stretch the upper part of the garment to a certain degree and thus impart a smoother and more perfect finish. After the operation is completed, the shirt is entirely released when the operator draws the clamping levers 87 upwardly, and the parts are then in the position shown in Fig. 13, with the bosom board however separated from the heated bed, which latter is shown in this figure merely to illustrate the general combination of the essential parts of the apparatus.

The operation of the two machines in sequence, as described, completes the pressing operation, enabling the operator to fold and fasten the shirt in the usual manner to be placed in stock and on sale. The method and apparatus together do away with highly skilled labor and insure a very superior finish and appearance and enable expensive shirts and shirts made of the finer grades of fabrics to be pressed as well as the coarser grades of shirts. When the method is carried out with apparatus of the kind described, it does away with a considerable amount of hand labor and eliminates the personal equation in pressing shirts. It will be understood that the particular embodiment of the invention described and illustrated does not limit its scope in any manner, the invention covering modifications in or departures from the present showing that may be utilized to carry out the method set forth or some equivalent method.

What I claim is:—

1. The method of pressing shirts, consisting in arranging and pressing the front portions of the yoke at the sides of the neck band, and holding the pressed portions stationary while arranging and pressing the back portion of the yoke.

2. The method of pressing shirts, consisting in arranging and pressing the front portions of the yoke at the sides of the neck band, holding the pressed portions stationary while arranging and pressing the back portion of the yoke, and holding the front portions of the yoke stationary while arranging and pressing the bosom.

3. The method of pressing stock shirts, consisting in expanding and holding stationary the shirt neck band, adjusting and straightening the yoke seams at the sides of the neck band relative thereto, holding the side portions of the bosom and yoke stationary, and pressing the yoke in a manner to form a folding line at the back of the neckband and tangent thereto.

4. The method of pressing stock shirts, consisting in expanding and holding stationary the shirt neck band, adjusting and straightening the yoke seams at the sides of the neck band relative thereto, holding the side portions of the bosom and yoke stationary, pressing the yoke in a manner to form a folding line at the back of the neck band and tangent thereto, and utilizing said folding line and the pressed adjacent portions of the shirt as a base from which to press the remainder of the shirt body.

In testimony whereof I affix my signature.

CHARLES L. BRALEY.

Witnesses:
Jos. H. Speller,
H. H. Grudele.